May 15, 1951     R. P. SCHIFFMANN     2,553,149

COMBINATION FISHING LURE AND BOTTLE OPENER

Filed May 18, 1948

INVENTOR.
Robert P. Schiffmann.
BY Bair & Freeman
Attys.

Patented May 15, 1951

2,553,149

UNITED STATES PATENT OFFICE 2,553,149

COMBINATION FISHING LURE AND
BOTTLE OPENER

Robert Paul Schiffmann, Chicago, Ill.

Application May 18, 1948, Serial No. 27,793

1 Claim. (Cl. 43—42.06)

This invention relates to an improved fishing lure which can also be used as a bottle opener.

My improved fishing lure includes an elongated spoon of arcuate cross section. A hook is attached inside of the spoon and is bent back upon itself so that the barbed end portion thereof will extend in spaced relationship to the trailing end portion of the spoon. The leading end portion of the spoon is deflected inwardly, and a wire or wires extend from the end of the deflected spoon portion outside and past the barbed end portion of said hook. This wire serves to prevent entanglement of the hook with weeds when the lure is pulled through the water by a fishing line attached to the end of the deflected spoon portion. Since the wire extends in generally parallel relationship to the main portion of the spoon and in the direction in which the lure is pulled through the water, the wire will not be bent inwardly past the barbed end of the hook when the lure brushes against weeds. If the wire had been disposed so as to extend angularly outward from the leading end of a generally straight spoon, then, on brushing against weeds, the wire would be bent inwardly past the hook, and the hook would become entangled with the weeds.

The deflected leading end portion of the spoon is arched or domed to present a concave angularly disposed surface to the water ahead of the lure when the lure is pulled through the water whereby a rolling movement is imparted to the lure. As a consequence, a bait attached to the hook, for instance, a piece of pork rind, will perform a wavering movement.

The main portion of the spoon tapers from its trailing end. To make the spoon lighter, I form the spoon with a transverse aperture at its trailing end and provide a transverse outwardly bent tongue projecting over said aperture toward the trailing end. This tongue serves to prevent entry of weeds into the aperture when the lure is pulled through the water. Preferably, the stem of the hook extends through a small aperture in the trailing end of the spoon past the transverse aperture. To provide sufficient metal at the trailing end of the spoon and to rigidify this end, the middle portion of the trailing edge of the transverse aperture is offset into the aperture.

I have found that the above described fishing lure may be utilized as a bottle opener. More particularly, the above mentioned tongue may be placed under the edge of a bottle cap and the outside of the trailing end may be placed on top of the cap which can be pried loose from the bottle. Thus, a fisherman need not go to shore if he has brought with him one or more bottles but has forgotten to bring a bottle opener along.

It is therefore an important part of the present invention to provide an improved fishing lure which when pulled through the water will perform a rolling movement, which will not become entangled in weeds, which is characterized by light weight and which can also be used as a bottle opener.

Other and further objects and features of the present invention will become apparent from the following description and the appended claim taken in conjunction with the accompanying drawing which shows, by way of an illustrative example, a fishing lure according to the present invention. More particularly:

Figure 1:
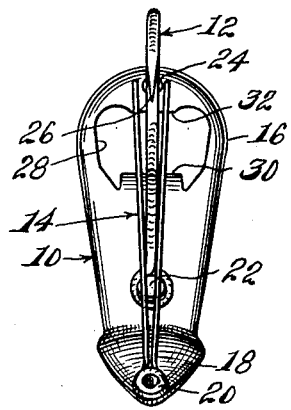
Figure 1 is an inside plan view of a fishing lure according to the present invention.
Figure 2:
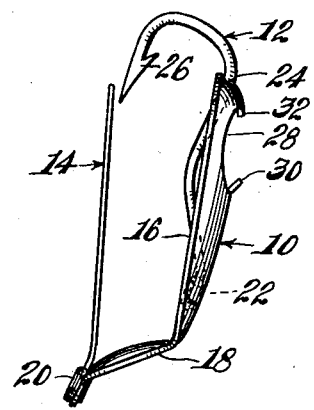
Figure 2 is a side elevation.
Figure 3:
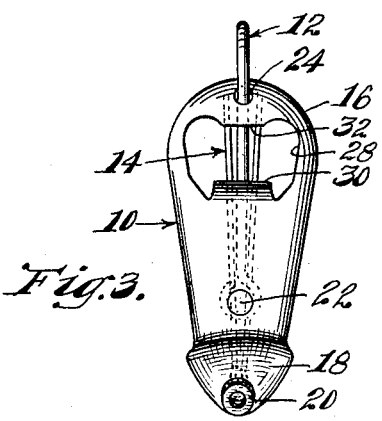
Figure 3 is an outside plan view.
Figure 5:
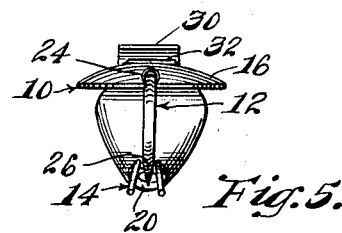
Figure 5 is a view of the trailing end.
Figure 4:
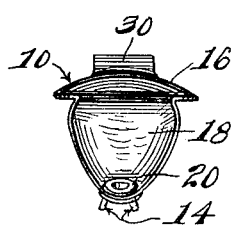
Figure 4 is a view of the leading end.

In the drawing, a fishing lure is shown comprising a spoon of arcuate cross section generally indicated by the reference numeral 10, a hook generally indicated at 12 and a wire indicated generally at 14 which serves as a weed guard for the hook. As shown, the spoon 12 is made up of a generally straight main portion 16 and an inwardly deflected leading end portion 18. The latter is pierced at its free end by an aperture receiving a tubular rivet 20. The wire 14 has its middle portion bent around the stem of this rivet on the inside of the spoon and the inner flange of the rivet overlies the resulting loop, so that the wire 14 is thereby attached to the free end of the deflected spoon portion. The two free portions of the wire extend backwardly from the rivet 20 in diverging relationship, past and outside of the barbed end 26 of the hook 12, as will be described in greater detail hereinbelow.

Particular attention is directed to the fact that the deflected spoon portion 18 is arched or domed so that the outer or leading surface of the deflected spoon portion is concave. When the lure is pulled through the water by a line passing through the tubular rivet 20, the concave leading surface of the deflected spoon portion 18 receives or gathers up water which is not easily discharged therefrom in any one direction. Hence, on being pulled through the water, the lure will perform a rolling movement.

The hook 12 is attached to the inside of the main spoon portion 16, as by means of a rivet 22. In place of this rivet a screw may be used, so that the hook can be removed and replaced. From its point of attachment, the hook 12 extends on the inner side of the main spoon portion 16 through a small aperture 24 in the trailing margin of the spoon, being thereafter bent back upon itself so that the barbed end 26 will extend within and spaced from the ends of the wire 14. Since this wire extends in general parallelism with the main spoon portion 16 and in the direction in which the lure is pulled through the water, the wire will not tend to be bent inwardly past the barbed hook end 26 when the lure brushes against weeds.

The broad trailing end portion of the spoon 10 is pierced by a generally transverse aperture 28 serving to reduce the weight of the spoon. An outwardly bent transverse tongue 30 projects over the aperture 28 from the leading edge of the aperture and serves to prevent entry of weeds into the aperture when the lure is pulled through the water. Further, the middle portion of the trailing aperture edge is offset into the aperture as at 32 for rigidifying the trailing margin of the spoon and to insure a metal web of sufficient width around the aperture 24.

Figure 6:
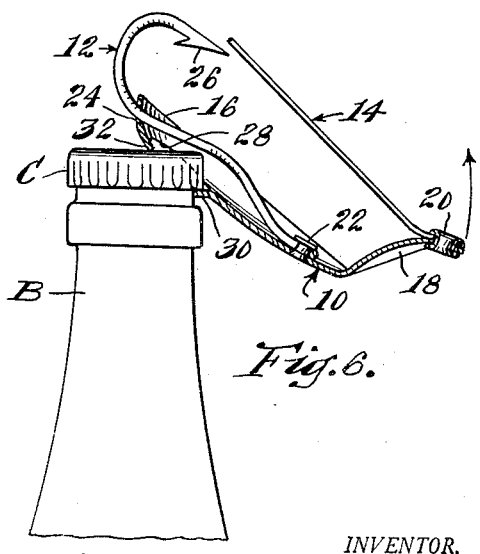
Figure 6 shows the use of the device for opening a bottle.

As shown in Figure 6 the fishing lure of this invention can be utilized for removing a cap C from a bottle B. For this purpose, the tongue 30 is placed under the edge of the cap C and the free end of the spoon, in particular, the offset aperture margin 32, is placed on top of the cap. The latter can then easily be pried off from the bottle.

The arcuate cross sectional shape of the spoon serves to rigidify the spoon against the force exerted when the lure is used for opening bottles. The hook 12 may be arched outwardly between the rivet 20 and the aperture 24, to permit easier clearance of a bottle cap projecting through the aperture 28 (as shown in Figure 6) and also to align that portion of the hook passing through the aperture 24 with the sides of said aperture, for facilitating the assemblage of the lure.

Many details of construction can be varied within a wide range without departing from the principles of this invention and it is therefore not my purpose to limit the patent granted on this invention otherwise than necessitated by the appended claim.

I claim as my invention:

A fishing lure comprising a spoon having a leading end adapted to be attached to a fishing line and a hook attached to the inside of said spoon, said hook having a shank in said spoon, and a pointed portion in spaced relationship to the trailing end portion of said spoon, said spoon having a trailing end provided with a transverse aperture and a transverse tongue projecting outwardly and angularly from the edge of the aperture toward said trailing end and operative to deflect weeds away from said aperture when said line is pulled through the water, said tongue further being capable of being disposed under the edge of a bottle cap with the outside of the trailing spoon end resting on top of the bottle cap for prying the cap loose from a bottle, said shank having a portion in registration with said aperture provided with a curve away from the aperture for accommodating a portion of the bottle cap inserted in the aperture in the prying operation.

ROBERT PAUL SCHIFFMANN.

REFERENCES CITED

The following references are of record in the file of this patent:

UNITED STATES PATENTS

| Number | Name | Date |
| --- | --- | --- |
| Re. 16,636 | Skelly et al. | May 24, 1927 |
| D. 138,415 | Douglass | Aug. 1, 1944 |
| 1,418,229 | Buddle | May 30, 1922 |
| 1,546,673 | Poulsen | July 21, 1925 |
| 1,628,715 | Enkler et al. | May 17, 1927 |
| 1,888,641 | Toepper | Nov. 22, 1932 |
| 1,928,367 | Buddle | Sept. 26, 1933 |
| 2,164,415 | Mallett | July 4, 1939 |
| 2,235,905 | Sherwood | Mar. 25, 1941 |

FOREIGN PATENTS

| Number | Country | Date |
| --- | --- | --- |
| 466,444 | Great Britain | 1937 |
| 871,135 | France | 1942 |
| 875,059 | France | 1942 |